United States Patent [19]
Gessel

[11] Patent Number: 5,790,647
[45] Date of Patent: Aug. 4, 1998

[54] SUBSCRIBER FEATURE SERVICES IN A TELECOMMUNICATIONS SYSTEM

[75] Inventor: Robert Gessel, Plano, Tex.

[73] Assignee: Ericsson, Inc., Richardson, Tex.

[21] Appl. No.: 574,370

[22] Filed: Dec. 18, 1995

[51] Int. Cl.$^6$ .................................................. H04M 3/42
[52] U.S. Cl. .................. 379/201; 379/216; 379/242; 379/243
[58] Field of Search ........................ 379/112, 120, 379/113, 201, 207, 209, 210, 211, 212, 216, 354, 355, 242, 243

[56] References Cited

U.S. PATENT DOCUMENTS

| | | | |
|---|---|---|---|
| 4,897,866 | 1/1990 | Majmudar et al. | 379/201 |
| 4,998,291 | 3/1991 | Marui et al. | 455/563 |
| 5,206,901 | 4/1993 | Harlow et al. | 379/211 |
| 5,247,571 | 9/1993 | Kay et al. | 379/230 |
| 5,327,488 | 7/1994 | Garland | 379/201 |
| 5,345,380 | 9/1994 | Babson, III et al. | 364/400 |
| 5,359,651 | 10/1994 | Draganoff | 379/354 |
| 5,402,477 | 3/1995 | McMahan et al. | 379/201 |
| 5,422,941 | 6/1995 | Hasenauer et al. | 379/207 |
| 5,425,092 | 6/1995 | Quirk | 379/215 |
| 5,425,097 | 6/1995 | Pula | 379/396 |
| 5,509,062 | 4/1996 | Carlsen | 379/211 |
| 5,544,239 | 8/1996 | Andruska et al. | 379/207 |
| 5,574,780 | 11/1996 | Andruska et al. | 379/207 |
| 5,642,414 | 6/1997 | Kazemzadeh | 379/355 |

FOREIGN PATENT DOCUMENTS

0651 547 A2 10/1994 European Pat. Off.

*Primary Examiner*—Ahmad F. Matar
*Assistant Examiner*—Scott Wolinsky
*Attorney, Agent, or Firm*—Jenkens & Gilchrist

[57] ABSTRACT

Special subscriber features available to a telecommunications subscriber are selected for a particular B-number preassigned to a particular subscriber and stored in a database maintained by a local exchange servicing the subscriber. Whenever an original or incoming call is requested from the local exchange, the involved B-number is compared against the B-number stored in the database. If there is a match, all preassigned subscriber features for that particular B-number are executed prior to the establishment of originating or terminating call connections.

22 Claims, 4 Drawing Sheets

SUBSCRIBER FEATURE SERVICES IN A TELECOMMUNICATIONS SYSTEM

BACKGROUND OF THE INVENTION

1. Technical Field of the Invention

The present invention relates to a telecommunications switching system and, in particular, to the automatic activation of special subscriber features for a telecommunications subscriber.

2. Description of Related Art

As stored program-controlled (SPC) switching systems have evolved, a wide variety of useful features have been developed to extend the communication capabilities such systems provide. One example is call forwarding where a customer provides a forward-to directory number to the switching system and the switching system thereafter forwards all incoming calls for the customer to the provided directory number. Other examples includes call waiting, cancel call waiting, automatic callback, and account codes. However, even with the advancement of such SPC switching systems and subscriber features, many telecommunications users find the activation sequences for such features confusing and cumbersome. Furthermore, once a customer has a feature activated, all calls originated or terminated thereafter are controlled by the activated feature. Accordingly, a customer cannot selectively activate or deactivate a feature for a particular incoming or originating call unless she manually dials the necessary service codes beforehand each time.

With the increased number of special subscriber features, telecommunications subscribers are realizing that certain features are more relevant and useful for certain individual or groups of B-numbers. If a subscriber is talking with her boss or client, she may not wish to be disturbed by a call waiting tone. Therefore, in order to bar the call waiting tone intrusion, she has to dial the cancel call waiting service code before originating a call toward her boss or client. If her boss or client calls her first, she has to inconveniently interrupt the conversation by flashing to receive a recall dial tone (RDT) and enter the cancel call waiting service code before re-establishing a connection to bar future call waiting tone interruptions. Also, if a subscriber is already in speech and an incoming call is received from a client, the subscriber may wish to immediately forward such a call to her secretary; whereas, if a personal call is received, it is instead forwarded to her voice-mail. Additionally, a subscriber may know that her called party's line is often busy and wish to place an automatic call back request along with a call setup. Placing such a request monitors the called party's line if it is busy and automatically reinitiates a new call setup as soon as the B-party's line goes idle. In order to implement the above request, currently, the subscriber has to dial the service code for the automatic call back feature and receive a recall dial tone before placing a call toward the desired B-number.

However, because of human nature, subscribers often forget to enter the necessary service codes to activate the wanted features when originating calls. Furthermore, for incoming calls, the receiving subscriber has no option to invoke the wanted special features unless that subscriber reluctantly flashes during the middle of a conversation to enter the service codes in order to activate the features.

Even though there are many different telephone sets with auto-dialing and stored telephone directory to alleviate the above problems, they still have a number of disadvantages. They normally have some kind of memory device for storing preselected and frequently called telephone numbers, and usually every one of those numbers has a corresponding push-button. Telecommunications users can program one of those push-buttons to correspond with a string of service codes needed to activate and deactivate a desired telecommunications feature. As an illustration, push-button A could store the service code for activating the cancel call waiting feature. A subscriber could first enter push-button A before placing a call toward her boss in order to activate the feature. However, the subscriber must still remember to push the push-button in order to activate the feature, and furthermore, such device cannot assist her if she receives an incoming call from her boss first. Also, each subscriber must be equipped with an expensive special telephone device and is limited by the number of push buttons and memory capacities provided by such a device.

Therefore, it would be advantageous to provide special subscriber features so that when a subscriber dials a B-number, all pre-assigned subscriber features for that particular B-number are automatically activated by the subscriber's local exchange. Similarly, when an incoming call is received, the local exchange servicing the subscriber determines whether there are any preassigned subscriber features for that particular incoming call and automatically executes the assigned features.

SUMMARY OF THE INVENTION

The subject matter of the present invention relates generally to the advanced use of special subscriber features in a telecommunications system. The present invention discloses a system which focuses subscriber features not on A-party, but on B-party. A single A-party (A-number) may possess a number of special subscriber features at her disposal. Selected ones of those subscriber features are pre-assigned to a particular B-party (B-number). If the A-party originates a call to or receives a call from that B-party, the pre-assigned subscriber features are retrieved from a database within the local exchange servicing the A-party and automatically activated before establishing a connection between the two parties. This improves the calling sequences and service functionalities by allowing subscribers to do away with manually dialing the required access codes or service codes and automatically providing desired subscriber features for each individual B-number.

In one aspect, the present invention includes a method and apparatus for automatically effectuating subscriber features when a call setup is originated or received from a particular B-party. Special subscriber features available to an A-party is associated with a particular B-party by storing the B-party's directory number along with subscriber feature service codes in a database associated with the local exchange servicing the A-party.

In another aspect, the present invention includes a mechanism for storing B-numbers and subscriber feature service codes that are to be automatically executed before the A-party establishes a connection with the B-party.

In still another aspect, the present invention provides a method for receiving directory number and service codes from a telecommunications subscriber; identifying the B-party associated with the received directory number; and storing the received data in a database within a telecommunications exchange servicing the telecommunication subscriber.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF A PRESENTLY PREFERRED EXEMPLARY EMBODIMENT

Figure 1:
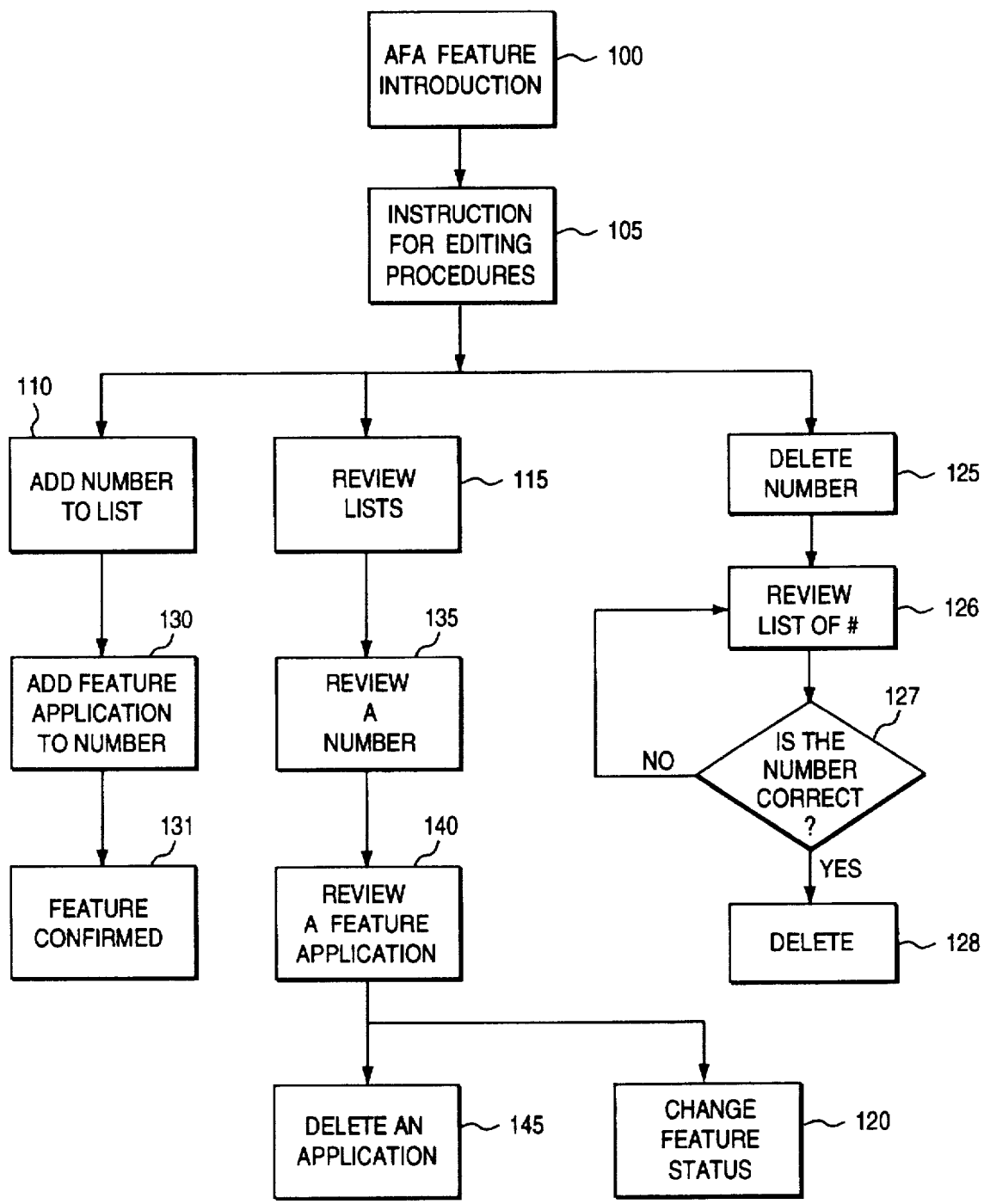
FIG. 1 is a block diagram illustrating the available options in the automatic feature application (AFA) system of the present invention.

The present invention includes a system that focuses subscriber features not on the A-party, but on the B-party of a connection. A single subscriber may possess a number of special subscriber features at her disposal. However, not all of them are used consistently for all calls made by her. For some of her more important B-parties, she might want to always activate the cancel call waiting feature to prevent any interruptions while she is in conversation. For certain parties, she may already know that her called party is usually on the phone, and if this particular call setup is also busy, she might want to activate the automatic call back feature. Such activation requests the telecommunications system to monitor the called party's line until it goes idle and to reinitiate a call setup toward the called party immediately thereafter. The subscriber might also want to input account codes and charge numbers when dialing certain customers or clients. Furthermore, if the called party does not have call waiting capability, the calling subscriber might want to temporarily provide him with her own call waiting capability (known as the call waiting originating feature) every time she calls that particular B-number so that she can call-wait on him.

Accordingly, more and more, a subscriber's advanced subscriber features are being customized not toward the subscriber who owns the features, but toward the called parties with whom the subscriber frequently communicates. Therefore, it is advantageous to provide subscriber features so that when a subscriber (A-party) dials a particular B-number, all pre-assigned subscriber features for that B-number are automatically activated by the subscriber's local exchange. Similarly, if an incoming call is received for an A-party, the local exchange for the A-party retrieves the calling party's number over the SS7 network, if available, and determines whether the calling party's number is stored in the database. In response to such a determination, all pre-assigned features are automatically executed by the local exchange before terminating the incoming call. As a result, if a subscriber wishes to have the "cancel call waiting feature" activated whenever her boss calls her, the telecommunications exchange automatically activates that feature before establishing a connection with her. This improves the calling sequences by allowing the subscriber to do away with manually dialing the necessary access codes and charge numbers.

In accordance with the present invention, instead of manually dialing access codes or service codes for features used with originating or terminating calls, a subscriber enters a desired B-number into the automatic feature application (AFA) system and attaches as many features as are supported and allowed by the system for that subscriber. For originating feature applications, the subscriber associates certain originating features with certain B-numbers, and when these B-numbers are dialed, the associated features are automatically activated/deactivated. For terminating feature applications, the subscriber associates certain terminating features with certain B-numbers, and when terminating calls from those B-numbers are received, the associated features are automatically activated/deactivated. Furthermore, there are some features that can be activated/deactivated for both originating and terminating calls.

Accordingly, FIG. 1 is a block diagram illustrating the available options in the automatic feature application (AFA) system of the present invention. A subscriber can initiate the AFA system by entering the proper service code at step 100. In response, the AFA system actuates an announcement machine instructing the subscriber as to all the available options and corresponding key numbers at step 105. If the subscriber wishes to add a new B-number by entering the corresponding key number at step 110, the AFA system guides the subscriber through a process more fully described in FIG. 2 to add the new B-number and associated service codes to the database managed by the AFA system at step 130. After the service code and the new B-number are entered, the AFA system confirms the new addition by playing announcements with the feature name associated with the received service code and the entered B-number at step 131.

The subscriber can also review the previously stored B-numbers and the associated subscriber features for each B-number at step 115. The AFA system retrieves all the B-numbers that have been stored for this subscriber and plays announcements for her review at step 135. If she selects a particular B-number from the list, the AFA thereafter retrieves the assigned subscriber features for that particular B-number and plays announcements for her review at step 140. She can delete any one of the subscriber features previously assigned to the particular B-number at step 145. She can further change the status of a subscriber feature at step 120. Such a change allows her to toggle between the activation and deactivation of a subscriber feature.

She can also delete a B-number that has been previously stored at step 125. The AFA system plays announcements to enable the user to review the numbers stored in the system and to choose a particular one to be deleted at step 126. After confirming such a deletion at step 127, the actual entry is removed from the database (step 128). Such a deletion removes the B-number as well as all the associated subscriber features for that particular B-number from the database. Even though announcement machines for illustrative purposes are used above to communicate with a AFA user, with proper terminal equipment, the announcements can be replaced with a screen display on the user's terminal. Furthermore, a user may repeat any part of the above options by going back to step 105.

Figure 2:
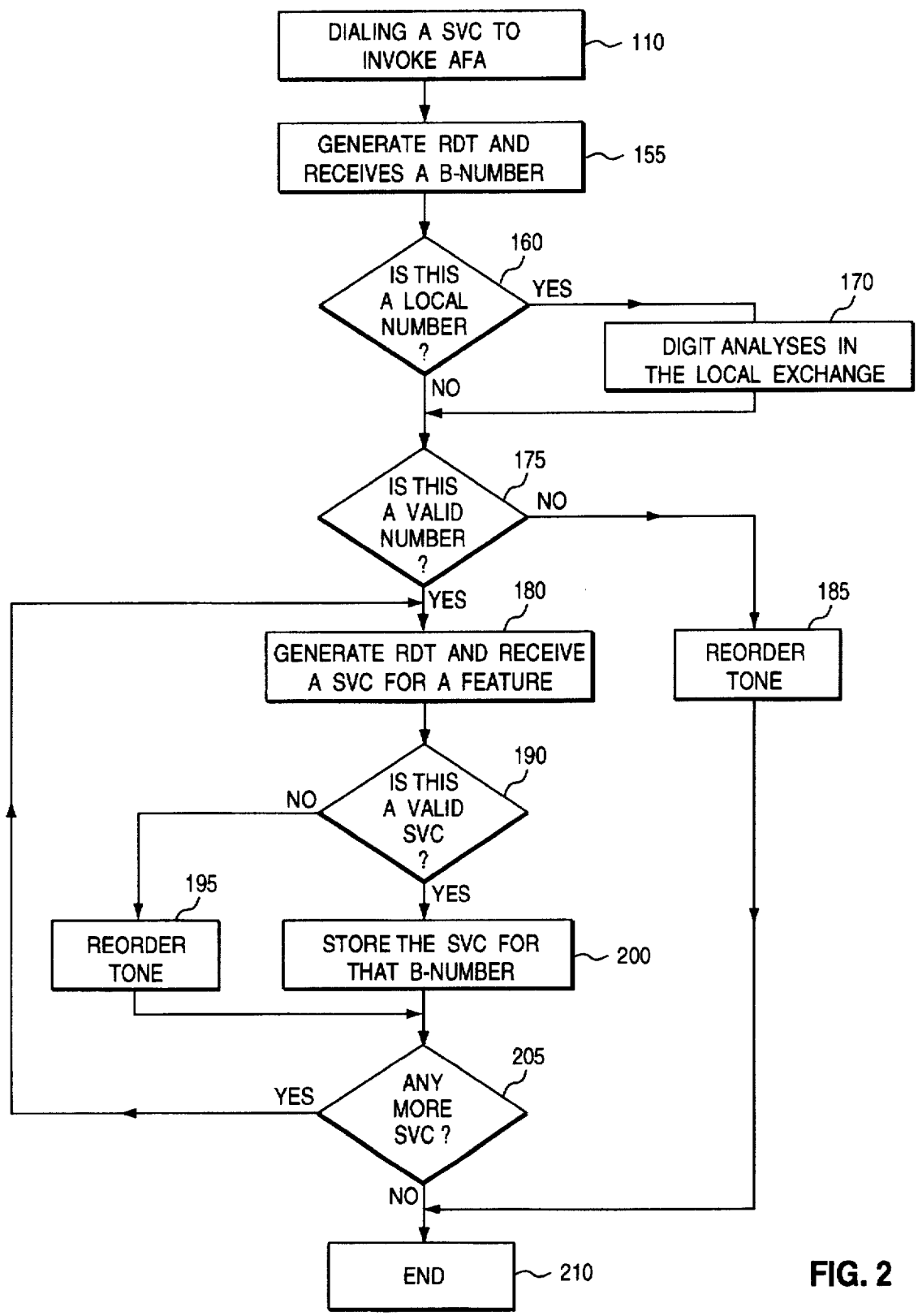
FIG. 2 is a flowchart illustrating the sequences for adding a new B-number along with desired subscriber features within the AFA system.

FIG. 2 is a flowchart illustrating the sequences for adding a new B-number along with desired subscriber features within the AFA system. A subscriber dials the appropriate key number or service code at step 110 to initiate the adding procedure within the AFA system as also illustrated in FIG. 1. The AFA system generates a recall dial tone (RDT) or announcement to instruct the subscriber to enter the new B-number at step 155. The AFA system then determines whether the received B-number is a local number serviced by the same local exchange at step 160. If the received number has a digit pattern indicating that it is a local number (e.g., seven digit number with a recognizable three digit prefix), then the AFA system performs a digit analysis to determine whether the entered number is a valid subscriber number at step 170. If the received number is not a local number, the AFA system checks for the length of the entered digits to determine whether this is an acceptable number (step 175).

If the entered B-number is not a valid subscriber number, in order to save memory space within the database, the request to add such a number is refused and the reorder tone is sent to the subscriber at step 185. If the entered B-number is a valid number, the AFA system again generates an Recall Dial Tone (RDT) to instruct the subscriber to start entering the service codes associated with subscriber features to be added to the list at step 180. The validation of entered service codes is performed at step 190. If the entered service code is an invalid service code or the subscriber does not have a subscription to the subscriber feature associated with the entered service code, a reorder tone is sent informing her of the system's refusal to accept the service code at step 195. If the entered service code is a valid service code and the subscriber has a subscription to the feature, such service code is stored in the database and associated with the previously entered B-number at step 200. The AFA system inquires whether the subscriber wishes to enter an additional feature at step 205. If the subscriber wishes to terminate the procedure, the AFA exits the system at step 210; otherwise, steps 180, 190, 195, 200 and 205 are repeated for the next service code. Even though RDT and reorder tones are used above to communicate with users, the tones can be easily replaced with interactive announcements to communicate with users. The tones or announcements are further timed to enable users ample time to respond to the AFA requests without tying up resources indefinitely. Lastly, the above service codes may also comprise additional subscriber entered numbers or information as may be necessary for the effectuating of the desired features.

Figure 3:
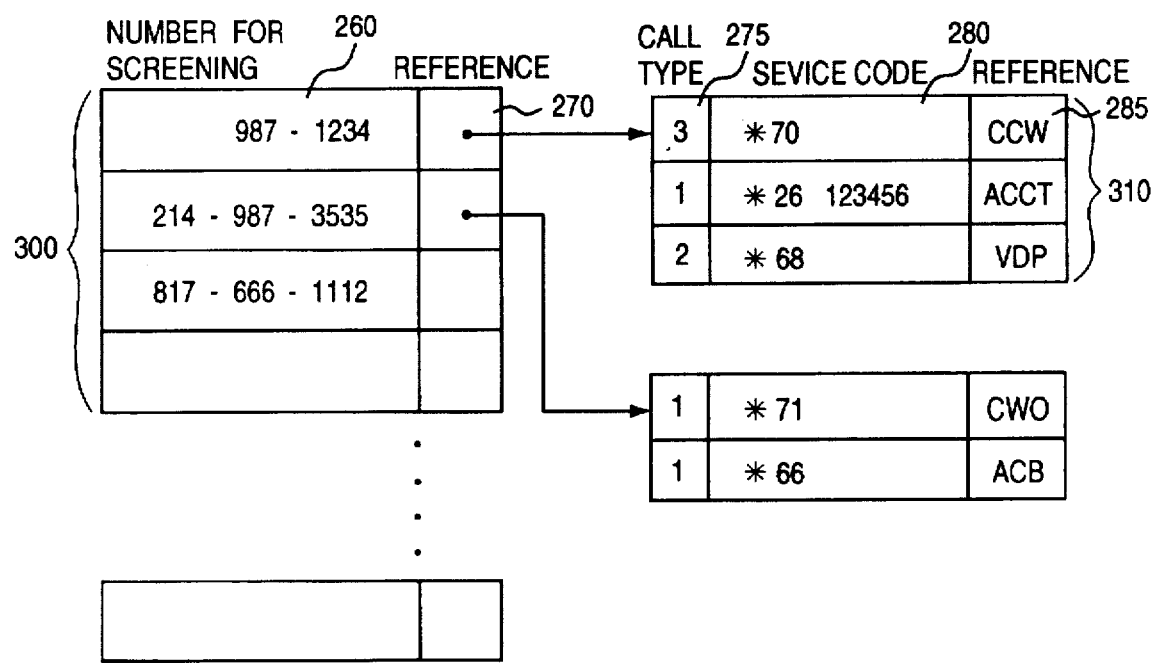
FIG. 3 is a block diagram illustrating the data structure utilized by the AFA system to store B-numbers and subscriber feature service codes of the present invention.

FIG. 3 is a block diagram illustrating the data structure utilized by the AFA system to store the received B-numbers and service codes in accordance with the present invention. Table 300 contains the B-numbers to be screened by the AFA system. When a call is originated or terminated, the B-number involved in the call setup is compared against the list 260 stored in the table 300. If the B-number involved in the call setup has a match with one of the entries in the database, then the corresponding reference pointer 270 is used to retrieve the table 310. The table 310 includes the call type column 275 indicating whether this feature is to be invoked for incoming, terminating or both kinds of calls. Call type 3 in column 275 indicates that this feature is to be invoked for all types of calls. Call type 1 indicates that this particular feature is to be invoked only for originating calls, and call type 2 indicates that this feature is to be invoked only for terminating or incoming calls. The service code column 280 within the table 310 stores the necessary service codes and subscriber input data needed to effectuate the desired subscriber features. For example, the service code *70 invokes the cancel call waiting (CCW) 285 feature barring all future call waiting interruptions during the subsequent telecommunications connection. The service code *26 followed by a string of digits allow the subscriber to bill a particular originating call to a certain subscription as provided by the account code feature (ACCT). The service code *68 invokes the voice data protection (VDP) feature protecting the speech connection from any kind of interruptions or interventions by a third party (operators or secretaries usually have an option to intervene a call for emergency purposes).

Accordingly, a single B-number stored in the table 300 can be assigned as many subscriber features as allowed by the subscriber. The entries in the table 310 can be added, deleted, or modified in accordance with the steps disclosed in FIG. 1. Similarly, the entries in the table 300 can be added or deleted, and when a B-number entry is deleted from the table 300, the corresponding table 310 is also automatically removed from the database by the AFA system as illustrated in FIG. 1.

Figure 4:
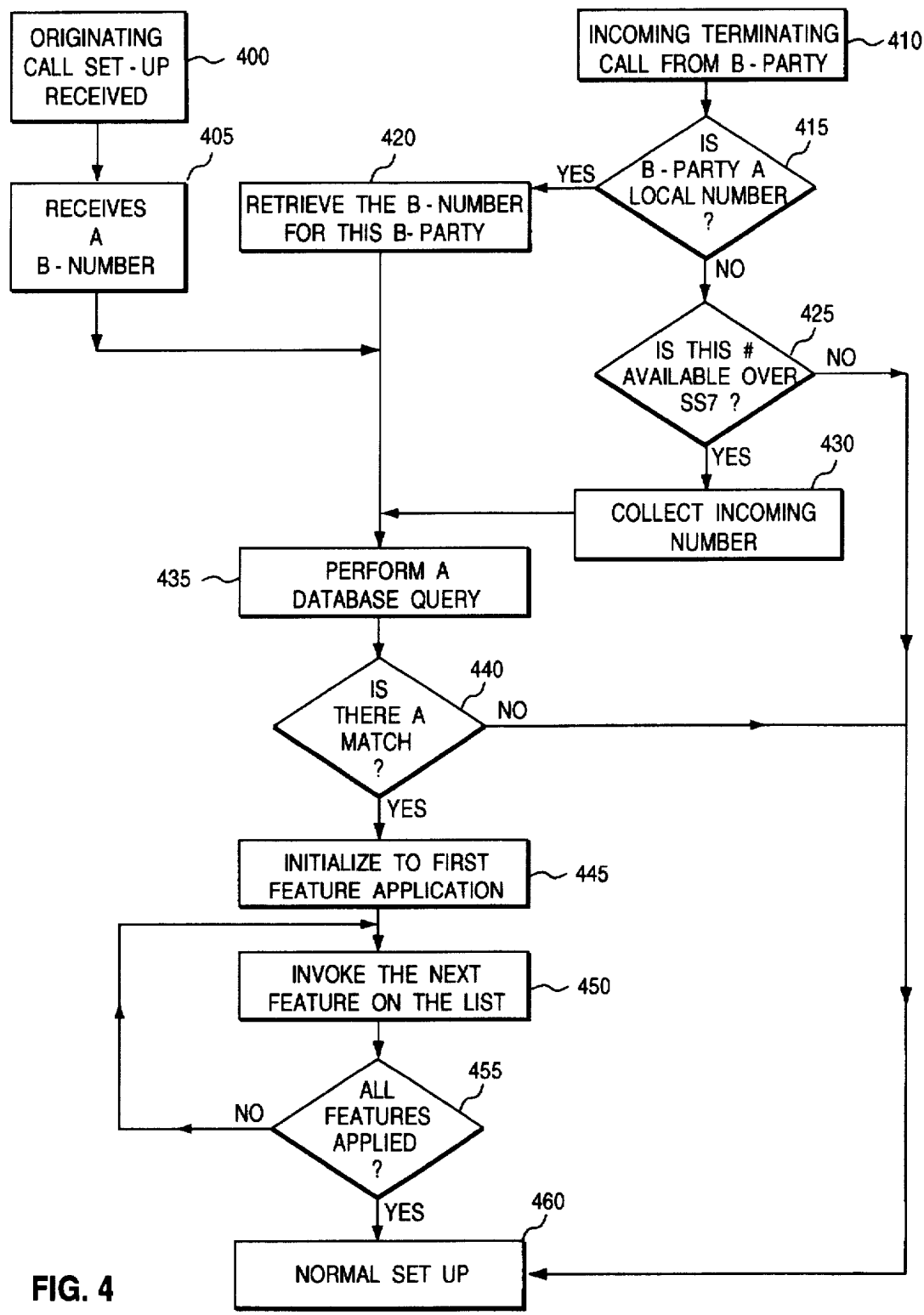
FIG. 4 is a flowchart illustrating the sequences for automatically effectuating the assigned subscriber features for particular incoming and originating calls.

The AFA system utilizes the information stored in the tables 300 and 310 to automatically provide the desired subscriber features before originating or terminating call connections are established. Accordingly, FIG. 4 is a flowchart illustrating the sequences executed by the AFA system for automatically effectuating the assigned subscriber features for incoming and terminal calls.

If a subscriber picks up her telephone and enters a B-number to initiate an originating call setup at step 400, the AFA system is automatically invoked and retrieves the dialed digits at step 405. Likewise, if a request for an incoming call setup is received at the local exchange servicing the subscriber at step 410, the AFA system is similarly invoked and determines whether this incoming call request is from a local subscriber at step 415. If the B-party originating the call is another local subscriber, the B-number associated with that particular B-party is ascertained by the AFA system at step 420. However, if the B-party initiating the call termination is not a local subscriber and serviced by a remote exchange, then the local exchange servicing the subscriber determines if the calling party's telephone number is available over the SS7 network or via other means at step 425.

SS7 is a telecommunications protocol based on the common channel signaling (CCS) system for providing a separate packet-switched network for transmitting call setup and routing packets, as well as other supervisory and control information. Consequently, a pair of remote exchanges connected to an SS7 network can exchange subscriber information including calling party's directory numbers via Integrated Service Digital Network (ISDN) User Part (ISUP) messages. Such capabilities enable subscriber features with a caller identification device attached to a called party to display the calling party's name or telephone number for an incoming call. The system of the present invention utilizes such ISUP messages to determine whether the subscriber entered B-number is a valid number at step 175. Without establishing a voice connection between exchanges connected to the SS7 network, a local exchange receives ISUP messages containing the calling party number over the SS7 network.

If the involved exchanges are not connected via an SS7 network, the AFA system has no way of determining the calling B-party's directory number and the incoming call is setup as a normal termination call without further intervention by the AFA system at step 460. However, if the calling party's number is available over an SS7 network, the local exchange servicing the subscriber retrieves the directory number associated with the originating subscriber at step 430.

After receiving the directory number associated with the B-party, the AFA system performs a database query to screen the received B-party's directory number against the entries in the database table 300 of FIG. 3 at step 435. If there is no match at step 440, the terminating or originating call setup is handled by a normal setup procedure without further intervention by the AFA system at step 460. On the other hand, if there is a match between the B-number involved in the call setup request and one of the entries in the table 300, by way of the reference pointer 270 in the table 200, the AFA system retrieves the corresponding table 310 for that particular B-number. The AFA system then initializes the index pointer to the very first row of the table 310 at step 445. The AFA system then determines whether the call type stored in the call type column 275 for that particular subscriber feature corresponds to the current call setup. For example, the cancel call waiting service code *76 stored in the first row of the table 310 in FIG. 3 indicates that this feature should be applied for both kinds of calls (as indicated by call type value 3).

After determining that this particular subscriber feature is appropriate for this particular call setup, that subscriber feature service is executed by processing the stored service code along with any other stored data in the column 280 at step 450. If the service is no longer subscribed, then the service is not invoked and the processing continues to the next entry in the list. Following the execution of the associated subscriber feature, if there is no more service code to be executed then initial call setup is allowed to proceed with a normal call setup procedure at step 460. If there are more service codes to be compared and executed remaining in the table 310, the index pointer is incremented to point to the next row and the steps 450 and 455 are sequentially repeated until the end of the table is reached.

As a result, before an incoming or originating call connection is established, all pre-assigned subscriber features toward a particular B-number have been automatically executed. Consequently, in order to fully utilize the telecommunications services a subscriber has subscribed-to, the subscriber no longer has to inconveniently dial or break the speech connection to invoke the desired subscriber features.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A method for automatically implementing a selected subscriber feature pursuant to a call placed between a first subscriber and a second subscriber by way of a local telecommunications exchange servicing said first subscriber, said method comprising the steps of:

associating a service code for said selected subscriber feature with said second subscriber at said local telecommunications exchange;

receiving a call setup request for a call between said first subscriber and said second subscriber;

retrieving the service code associated with said second subscriber;

executing in response to the receipt of said call setup request the retrieved service code for said selected subscriber feature associated with said second subscriber; and completing the call setup between said first subscriber and said second subscriber in response to said request.

2. The method of claim 1 wherein said step of associating said selected subscriber feature with said second subscriber comprises the steps of:

receiving a directory number associated with said second subscriber from said first subscriber;

receiving the service code associated with said subscriber feature; and storing said service code along with said directory number within a database associated with said local telecommunications exchange.

3. The method of claim 2 wherein said step of associating said selected subscriber feature with said second subscriber further comprises the steps of:

determining whether said received directory number is a valid number;

receiving said service code in response to a determination that said received directory number is a valid number;

determining whether said first subscriber has a subscription to said subscriber feature; and storing said service code along with said directory number in response to a determination that said first subscriber has said subscription.

4. The method of claim 3 wherein said local telecommunications exchange forms part of a telecommunication network, said step of determining whether said directory number is a valid number further comprises the step of:

performing a digit analysis to determine whether said directory number is a valid number if said directory number is a local number.

5. The method of claim 1 wherein said step of receiving a call setup request for a call between said first subscriber and said second subscriber further comprises the step of:

receiving said call setup request within said local telecommunications exchange from said first subscriber toward said second subscriber to originate a call.

6. The method of claim 1 wherein said step of receiving a call setup request for a call between said first subscriber and said second subscriber further comprises the step of:

receiving said call setup request within said local telecommunications exchange from said second subscriber toward said first subscriber to complete a call.

7. A method for automatically implementing subscriber features subscribed to by a first subscriber within a local telecommunications exchange, wherein each of said subscriber features are associated with a second subscriber, and said subscriber features are implemented before an originating call setup from said first subscriber to said second subscriber is completed, said method comprising the steps of:

storing service codes representing said associated subscriber features along with a directory number representing said second subscriber in a database;

receiving dialed digits from said first subscriber to initiate a call setup;

performing a database query to determine whether there is a match between said dialed digits and said directory number stored in said database;

retrieving said service codes associated with said second subscriber if there is a match and implementing each of said subscriber features associated with said service codes; and completing a call setup between said first subscriber and said second subscriber following the implementation of said subscriber features.

8. The method of claim 7 wherein said step of storing said service codes and said directory number further comprises the steps of:

receiving from said first subscriber said directory number associated with said second subscriber;

receiving the service codes representing said subscriber features from said first subscriber in response to said directory number being a valid number;

determining whether said first subscriber subscribes to the subscriber features represented by said received service codes; and storing said service codes along with said directory number into a database associated with the local telecommunications exchange in response to a determination that said first subscriber subscribes to said subscriber features.

9. The method of claim 8 wherein said step of receiving said directory number comprises the step of performing a digit analysis within said local telecommunications exchange to determine whether said directory number is a valid number.

10. A method of automatically implementing subscriber features subscribed to by a first subscriber within a local telecommunications exchange, wherein said subscriber features are associated with a second subscriber and said subscriber features are implemented before a terminating call from said second subscriber to said first subscriber is completed, said method comprising the steps of:

storing service codes representing said associated subscriber features along with a first directory number representing said second subscriber in a database;

receiving a call setup request from said second subscriber to complete a call directed toward said first subscriber;

retrieving a second directory number representing said second subscriber over a SS7 telecommunications network;

performing a database query to determine whether there is a match between said second directory number and said first directory number stored in said database;

retrieving the stored service codes associated with said second subscriber if there is a match;

implementing each of said subscriber features associated with said retrieved service codes; and completing a call setup from said second subscriber to said first subscriber with said subscriber features already implemented.

11. The method of claim 10 wherein said step of storing said service codes and said directory number further comprises the steps of:

receiving from said first subscriber said directory number representing said second subscriber;

performing a digit analysis within said local telecommunications exchange to determine whether said directory number is a valid number;

receiving the service codes representing said subscriber features from said first subscriber in response to said directory number being a valid number;

determining whether said first subscriber subscribes to said subscriber features; and storing said service codes along with said directory number into a database within the local telecommunications exchange in response to a determination that said first subscriber subscribes to said subscriber features.

12. The method of claim 11 wherein said step of receiving said directory number comprises the step of performing a digit analysis within said local telecommunications exchange to determine whether said directory number is a valid number.

13. A system for automatically implementing a selected subscriber feature pursuant to a call placed between a first subscriber and a second subscriber by way of a local telecommunications exchange servicing said first subscriber, said system comprising:

means for associating a service code for said selected subscriber feature with said second subscriber at said local telecommunications exchange;

means for receiving a call setup request for a call between said first subscriber and said second subscriber;

means for retrieving the service code associated with said second subscriber;

means for executing in response to the receipt of said call setup request the retrieved service code for said selected subscriber feature associated with said second subscriber; and means for completing the call setup between said first subscriber and said second subscriber in response to said request.

14. The system of claim 13 wherein said means for associating said selected subscriber feature with said second subscriber comprises:

means for receiving a directory number associated with said second subscriber from said first subscriber;

means for receiving the service code associated with said subscriber feature; and means for storing said service code along with said directory number within a database associated with said local telecommunications exchange.

15. The system of claim 14 wherein said means for associating said selected subscriber feature with said second subscriber feature further comprises the steps of:

means for determining whether said received directory number is a valid number;

means for receiving said service code in response to a determination that said received directory number is a valid number;

means for determining whether said first subscriber has a subscription to said subscriber feature; and means for storing said service code along with said directory number in response to a determination that said first subscriber has said subscription.

16. The system of claim 15 wherein said means for determining whether said directory number is a valid number comprises:

means for performing a digit analysis to determine whether said directory number is a valid number if said directory number is a local number.

17. The system of claim 13 wherein said means for receiving a call setup request for a call between said first subscriber and said second subscriber comprises:

means for receiving said call setup request within said local telecommunications exchange from said first subscriber toward said second subscriber to originate a call.

18. The system of claim 13 wherein said means for receiving a call setup request for a call between said first subscriber and said second subscriber comprises:

means for receiving said call setup request within said local telecommunications exchange from said second subscriber toward said first subscriber to complete a call.

19. A telecommunication switching system for automatically implementing a special subscriber feature subscribed to by a first subscriber when said first subscriber originates a call toward a second subscriber, said system comprising:

a first storage register for storing a first directory number representing said second subscriber;

a second storage register for storing a service code associated with said second subscriber, said service code representing said special subscriber feature; and a switching element for comparing said first directory number stored in said first storage register with a second directory number entered by said first subscriber and for implementing said special subscriber feature associated with said service code stored in said second storage register when said first and second directory numbers match.

20. The telecommunication switching system of claim 19 wherein said second storage register further stores a type-of-call variable indicating that said subscriber feature is to be implemented for originating calls.

21. A telecommunication switching system for automatically implementing a special subscriber feature subscribed to by a first subscriber when said first subscriber receives a call from a second subscriber, said system comprising:

a first storage register for storing a first directory number representing said second subscriber;

a second storage register for storing a service code associated with said second subscriber, said service code representing said special subscriber feature; and a switching element for comparing said first directory number stored in said first storage register with a second directory number used in a call setup and implementing said special subscriber feature associated with said service code stored in said second storage register when said first and second directory numbers match.

22. The telecommunications switching system of claim 21 wherein said second storage register also stores a type-of-call variable indicating that said subscriber features is to be implemented only for incoming calls.

* * * * *